(12) United States Patent
Al-Taher et al.

(10) Patent No.: US 11,242,785 B2
(45) Date of Patent: Feb. 8, 2022

(54) PROCESS TO CAPTURE $SO_x$ ONBOARD VEHICLES AND SHIPS

(71) Applicant: SAUDI ARABIAN OIL COMPANY, Dhahran (SA)

(72) Inventors: Maryam M Al-Taher, Dhahran (SA); Esam Zaki Hamad, Dhahran (SA); Remi Mahfouz, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/917,148

(22) Filed: Jun. 30, 2020

(65) Prior Publication Data

US 2021/0404360 A1  Dec. 30, 2021

(51) Int. Cl.
*F01N 3/08* (2006.01)
*B01D 53/14* (2006.01)
(Continued)

(52) U.S. Cl.
CPC .......... *F01N 3/085* (2013.01); *B01D 53/1481* (2013.01); *B01D 53/50* (2013.01);
(Continued)

(58) Field of Classification Search
CPC .......... B01D 2257/302; B01D 53/1481; B01D 53/48; B01D 53/50; B01D 53/60;
(Continued)

(56) References Cited

U.S. PATENT DOCUMENTS

| 3,961,020 A | * | 6/1976 | Seki | ............ F01N 3/206 423/239.1 |
| 5,248,321 A | * | 9/1993 | Yang | .......... B01D 53/04 95/98 |

(Continued)

FOREIGN PATENT DOCUMENTS

| CA | 2908008 A1 | 4/2016 |
| CN | 105498452 A | 4/2016 |

(Continued)

OTHER PUBLICATIONS

Rezaei, F. et al.; "SOx/NOx Removal from Flue Gas Streams by Solid Adsorbents: A Review of Current Challenges and Future Directions"; energy & fuels, American Chemical Society, vol. 29, 2015, pp. 5467-5486 (20 pages).

(Continued)

*Primary Examiner* — Mark A Laurenzi
*Assistant Examiner* — Mickey H France
(74) *Attorney, Agent, or Firm* — Osha Bergman Watanabe & Burton LLP

(57) ABSTRACT

Provided is a process that may comprise cooling an engine exhaust emissions comprising $SO_x$ on a vehicle that may come from an engine. The cooled engine exhaust emissions comprising $SO_x$ may be passed to one or more absorption units. The $SO_x$ may be extracted from the engine exhaust emissions with a sorbent supported on solid porous media in an absorption unit on the vehicle to form an absorbed $SO_x$. The absorbed $SO_x$ may be desorbed, followed by forming (Continued)

one or more SO$_x$ product from the desorbed SO$_x$. The one or more SO$_x$ product may be unloaded to an off-vehicle facility.

19 Claims, 1 Drawing Sheet

(51) Int. Cl.
 B01D 53/50 (2006.01)
 F01N 3/20 (2006.01)
(52) U.S. Cl.
 CPC ........ *F01N 3/0885* (2013.01); *B01D 2257/30* (2013.01); *F01N 3/2046* (2013.01); *F01N 2570/04* (2013.01)
(58) Field of Classification Search
 CPC ...... F01N 3/2046; F01N 3/085; F01N 3/0871; F01N 3/0885; F01N 3/0807; F01N 3/0814; F01N 3/0821; F01N 3/0828; F01N 3/0878; F01N 2570/04
 USPC .......... 60/297, 274, 273, 281, 282, 309, 310
 See application file for complete search history.

(56) References Cited

U.S. PATENT DOCUMENTS

| | | | |
|---|---|---|---|
| 5,624,649 A | 4/1997 | Gal | |
| 5,687,565 A * | 11/1997 | Modica | F01N 3/0871 60/274 |
| 6,212,885 B1 * | 4/2001 | Hirota | F01N 3/2093 60/288 |
| 6,367,246 B1 | 4/2002 | Hirota et al. | |
| 7,431,757 B2 * | 10/2008 | Bellows | B01D 53/1418 423/243.01 |
| 8,038,774 B2 | 10/2011 | Peng | |
| 8,500,893 B2 | 8/2013 | Peng | |
| 9,714,593 B2 | 7/2017 | Doring | |
| 9,844,752 B2 * | 12/2017 | Molgaard | F01N 3/04 |
| 10,926,217 B2 * | 2/2021 | Sasaki | B63H 21/32 |
| 2001/0004450 A1 | 6/2001 | Held | |
| 2007/0196255 A1 | 8/2007 | Sherman et al. | |
| 2009/0087898 A1 * | 4/2009 | Haase | C12M 21/02 435/262.5 |
| 2009/0188782 A1 * | 7/2009 | Genuario | B01D 53/32 204/157.3 |
| 2010/0011956 A1 * | 1/2010 | Neumann | B01D 53/62 95/151 |
| 2010/0242728 A1 | 9/2010 | Radosz et al. | |
| 2010/0319539 A1 * | 12/2010 | Neumann | B01D 53/78 95/149 |
| 2011/0138781 A1 * | 6/2011 | Richter | C10G 25/003 60/274 |
| 2011/0146281 A1 * | 6/2011 | Lackner | B01D 53/75 60/685 |
| 2011/0223084 A1 | 9/2011 | Scialdone | |
| 2011/0224427 A1 | 9/2011 | Scialdone | |
| 2012/0042778 A1 | 2/2012 | Jung et al. | |
| 2012/0189519 A1 * | 7/2012 | Zhang | B01D 53/76 423/220 |
| 2013/0280151 A1 | 10/2013 | Lee et al. | |
| 2013/0327024 A1 * | 12/2013 | Hamad | B01D 53/92 60/274 |
| 2014/0050643 A1 * | 2/2014 | Zhang | B01D 53/76 423/220 |
| 2014/0127107 A1 * | 5/2014 | Suchak | B01D 53/60 423/235 |
| 2015/0044116 A1 * | 2/2015 | Suchak | B01D 53/60 423/235 |
| 2015/0068398 A1 | 3/2015 | Chinn et al. | |
| 2015/0202589 A1 * | 7/2015 | Sakurai | C01C 1/0488 518/702 |
| 2015/0300231 A1 * | 10/2015 | Panziera | B01D 63/043 95/9 |
| 2015/0314234 A1 * | 11/2015 | Sasson | B01D 53/507 423/242.6 |
| 2016/0051927 A1 * | 2/2016 | Panziera | B01D 53/30 95/45 |
| 2016/0160722 A1 * | 6/2016 | Doring | F01N 3/085 60/605.1 |
| 2016/0243491 A1 | 8/2016 | Wei et al. | |
| 2016/0312676 A1 | 10/2016 | Youssef et al. | |
| 2017/0050144 A1 * | 2/2017 | Kamiyama | B01D 53/1481 |
| 2017/0165609 A1 * | 6/2017 | Norling | B01D 53/1475 |
| 2017/0296963 A1 * | 10/2017 | Richardson | B01D 53/56 |
| 2018/0036673 A1 * | 2/2018 | Sundaram | B01D 53/0473 |
| 2018/0140997 A1 * | 5/2018 | Richardson | B01F 5/0451 |
| 2018/0154309 A1 * | 6/2018 | Patterson | F01N 3/28 |
| 2020/0061527 A1 * | 2/2020 | Gong | B63J 4/002 |
| 2020/0215483 A1 * | 7/2020 | Pinhasi | B01D 53/60 |
| 2020/0269185 A1 * | 8/2020 | Richardson | B01D 53/1475 |
| 2020/0289983 A1 * | 9/2020 | Pinhasi | B01D 53/78 |
| 2021/0031938 A1 * | 2/2021 | Cordatos | B01D 53/228 |

FOREIGN PATENT DOCUMENTS

| | | |
|---|---|---|
| CN | 106938188 A | 7/2017 |
| CN | 109621640 A | 4/2019 |
| EP | 2692413 A1 | 2/2014 |
| EP | 2693013 A1 | 2/2014 |
| EP | 3029289 A1 | 6/2016 |
| JP | H0576771 A | 3/1993 |
| WO | 1992/008541 A1 | 5/1992 |
| WO | 2008127671 A2 | 10/2008 |
| WO | 2016028290 A1 | 2/2016 |

OTHER PUBLICATIONS

Cui, G. et al.; "Highly efficient SO2 capture by phenyl-containing azole-based ionic liquids through multiple-site interactions"; Green Chemistry, The Royal Society of Chemistry, vol. 16, 2014, pp. 1211-1216 (7 pages).
Guo, Y. et al.; "Reaction Behavor of Sulfur Dioxide with Ammonia"; I & EC Research, American Chemical Society, vol. 44, 2005, pp. 9989-9995 (7 pages).
Zhang, Z. et al.; "Preparation and SO2 Sorption/Desorption Behavior of an Ionic Liquid Supported on Porous Silica Particles"; I & EC Research, American Chemical Society, vol. 48, 2009, pp. 2142-2148 (7 pages).
Ding, F. et al.; "Highly efficient and Reversible SO2 Capture by Surfactant-Derived Dual Functionalized Ionic Liquids with Metal Chelate Cations"; I & EC Research, American Chemical Society, vol. 53, 2014, p. 18568-18574 (7 pages).
International Search Report issued in corresponding International Application No. PCT/US2020/046091, dated Nov. 13, 2020 (4 pages).
Written Opinion issued in corresponding International Application No. PCT/US2020/046091, dated Nov. 13, 2020 (6 pages).

* cited by examiner

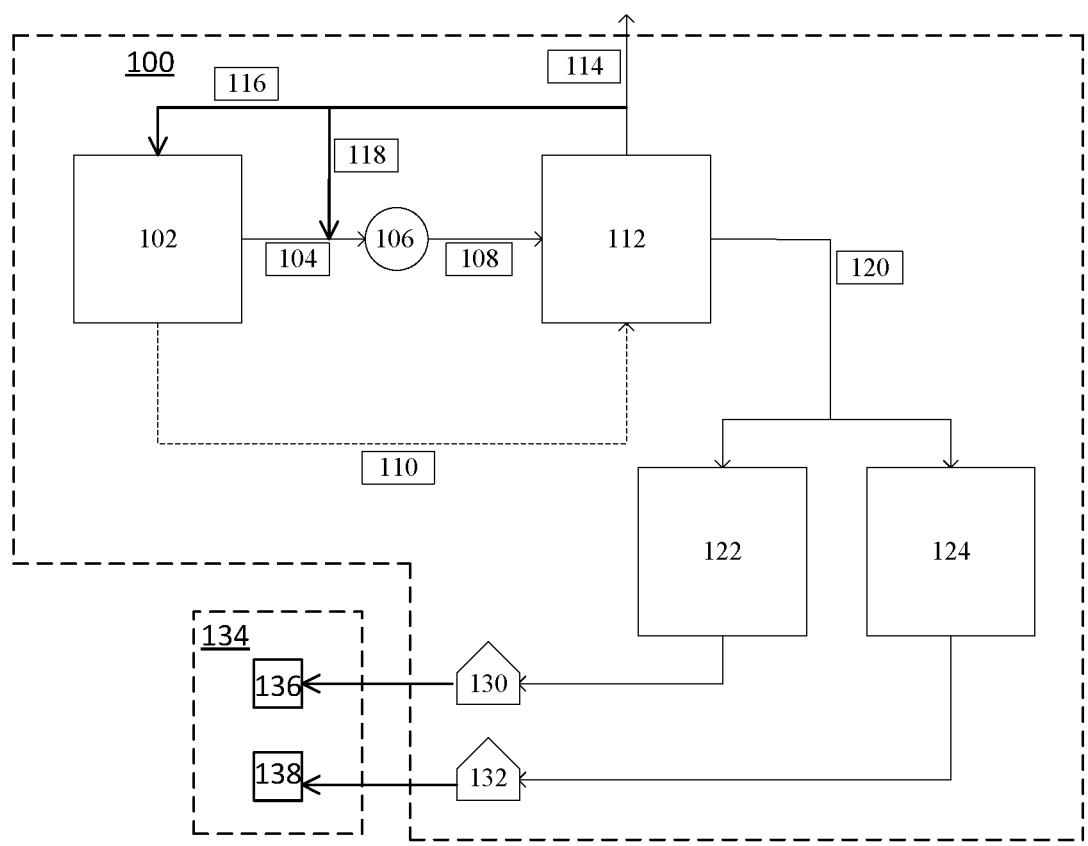

PROCESS TO CAPTURE $SO_x$ ONBOARD VEHICLES AND SHIPS

FIELD OF DISCLOSURE

The present disclosure generally relates to systems and processes for treatment of engine exhaust.

BACKGROUND

Sulfur oxides are commonly gases that can be found naturally occurring and can also be released into the environment. Some types of sulfur oxides ($SO_x$) are sulfur dioxide ($SO_2$) and sulfur trioxide ($SO_3$). $SO_x$ are formed when a fossil fuel containing sulfur or sulfur-comprising compounds is burned. Fossil fuels are not limited to various oils, gasolines, diesels, and coals, and they are often used for combustion processes in an engine.

During a combustion process that takes place in the engine, high temperatures and pressures use carbon-based fossil fuels along with an oxygen source to create energy. A byproduct of creating energy from the combustion process is the formation of oxides, like carbon dioxide ($CO_2$) and water. The combustion process is hot enough to allow oxygen and sulfur from fossil fuels to form $SO_x$ gases.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

One or more embodiments of the present disclosure may provide a process, comprising cooling an engine exhaust emissions comprising $SO_x$ on a vehicle, where the vehicle may have an engine providing the engine exhaust emissions; passing the cooled engine exhaust emissions comprising $SO_x$ to one or more absorption units; extracting the $SO_x$ from the engine exhaust emissions with a sorbent supported on solid porous media in an absorption unit on the vehicle so as to form an absorbed $SO_x$; desorbing the absorbed $SO_x$ so as to form a desorbed $SO_x$ on the vehicle; forming one or more $SO_x$ product from the desorbed $SO_x$ on the vehicle; and unloading the one or more $SO_x$ product from the vehicle to an off-vehicle facility.

One or more embodiments of the process may include solid porous media that may be selected from the group consisting of silicas, zeolites, aluminum oxides, carbon, and combinations thereof.

One or more embodiments of the process may include sorbent that may be selected from the group consisting of cationic-based ionic liquids, functionalized ionic liquids with metal chelate cations, and combinations thereof.

One or more embodiments of the process may include functionalized ionic liquids with metal chelate cations that may be selected from the group consisting of metal-polyoxyethylene derivatives, organometallic derivatives, metal-zeolite derivatives, metal oxides, metal-organic frameworks, and combinations thereof.

One or more embodiments of the process may include cationic-based ionic liquids that may be selected from the group consisting of tetramethylguanidinium lactate, an azole compound, ammonium salts, and combinations thereof.

One or more embodiments of the process may include forming one or more $SO_x$ product that may be one or more from the group consisting of sodium salts, sodium sulfite, sodium sulfate, potassium salts, calcium salts, calcium sulfite, calcium sulfate, ammonium salts, ammonium sulfur salts, ammonium sulfite, ammonium sulfate, acids, sulfurous acid, sulfuric acid, hydrogen gas, carbon dioxide gas, and water from the desorbed $SO_x$.

One or more embodiments of the process may include an engine that is of a type selected from the group consisting of diesel engines, gasoline engines, marine gas engines, marine diesel engines, diesel generators, gasoline generators, and combinations thereof.

One or more embodiments of the process may include a fuel that is provided to the engine that produces a high $SO_x$ concentration in the engine exhaust emissions.

One or more embodiments of the process may include a vehicle that has more than one type of engine on the vehicle and an engine exhaust emissions from the more than one type of engine that may be aggregated before the step of cooling the engine exhaust emissions.

One or more embodiments of the process may include a vehicle that is an air vehicle.

One or more embodiments of the process may include a step of desorbing the absorbed $SO_x$ that also forms a depleted sorbent, and the process may further comprise a step of applying a sub-atmospheric pressure source to the one or more absorption units such that the depleted sorbent is regenerated into a sorbent.

One or more embodiments of the process may include a sub-atmospheric pressure source that is a vacuum system of the engine.

One or more embodiments of the process may include a sub-atmospheric pressure source, where the sub-atmospheric pressure source may be a vacuum pump or vacuum generator separate from the engine.

One or more embodiments of the process may include one or more $SO_x$ product that may be a pressurized $SO_x$ gas stored in a storage tank.

One or more embodiments of the process may include a storage tank that includes porous media in the tank.

One or more embodiments of the process may include a vehicle that may be selected from the group consisting of road-going vehicles, air-going vehicles, surface ships, submarines, a rig, and a floating device.

One or more embodiments of the process may include an off-vehicle facility that may be a land-based station.

One or more embodiments of the process may include an off-vehicle facility that may be a second vehicle or a second marine vessel.

One or more embodiments of the process may include a cooled engine exhaust emissions that may have a temperature in a range of from about 20° C. to about 50° C.

One or more embodiments may include a step of cooling the engine exhaust emissions and may further comprise transferring heat from engine exhaust emissions to one or more absorption units.

Other aspects and advantages of this disclosure will be apparent from the following description made with reference to the accompanying drawings and the appended claims.

BRIEF DESCRIPTION OF DRAWINGS

FIG. 1 is one or more embodiments of an onboard process to capture $SO_x$ diagram.

One or more embodiments of the disclosure will be described with reference to the accompanying drawings, where like reference numerals denote like elements. It should be understood, however, that the accompanying figures illustrate the various implementations described and are not meant to limit the scope of various technologies described.

DETAILED DESCRIPTION

One or more embodiments of the present disclosure relate to a process that captures $SO_2$ and $SO_3$ from engine exhaust emissions of fuel combustion onboard vehicles through two or more absorption units utilizing ionic liquids.

Ionic liquids (ILs), as sorbent materials, are cationic-based ionic liquids or are ILs functionalized with metal chelate cations, or combinations thereof. Ionic liquids are supported on solid porous media, including materials like silica, zeolite, aluminum oxides, carbon, and any other suitable materials. ILs can be further supported on metal-polyoxyethylene derivatives, organometallic derivatives, metal-zeolite derivatives, metal oxides, metal-organic frameworks, and combinations thereof.

The absorption of $SO_2$ and $SO_3$ occurs at mild conditions. Desorption is carried out at temperatures greater than ambient temperature using heat from an engine. Enhanced desorption is carried out at pressures less than ambient pressure that is provided through a vacuum pump in diesel and ship engine systems or a vacuum resulting from a gasoline engine. In one or more embodiments, no extra energy is used to regenerate the sorbent material when the process to capture $SO_x$ includes gasoline engine vehicles.

Captured $SO_x$ is transferred through a $SO_x$ rich stream and compressed, converted onboard to useful materials that can be utilized in several agricultural and industrial applications, or both.

Compressed and converted $SO_x$ are stored onboard and unloaded in a gas station or a hub that is an off-vehicle facility.

This process is also environmentally sustainable, unlike common scrubbing methods for $SO_x$. In one or more embodiments, steps in the capture of $SO_x$ include storage and recycle while requiring no additional input in energy beyond energy obtained from an engine.

Sulfur Oxides $SO_2$ and $SO_3$

Sulfur oxides ($SO_x$), including sulfur dioxide ($SO_2$) and sulfur trioxide ($SO_3$), are one of air pollutants that result from burning fossil fuel in engines. Sulfur oxides have an impact on both environmental and human health. One or more embodiments of techniques can be used to remove sulfur oxides from an exhaust gas using the presently disclosed process to capture $SO_x$.

Although $SO_2$ and $SO_3$ are commonly found as gases, in one or more embodiments, $SO_2$ and $SO_3$ can take the form of a liquid or a solid.

$SO_2$ and $SO_3$ are weakly acidic. Absorption units and other equipment that contact these gases are configured to be acid resistant. When water, or air with moisture, contacts these sulfur oxide gases, they can react to produce mild basic salts through simple acid/base reactions, fumes, heat, and other suitable chemical reactions. Thus, absorption units are configured to be protected or mitigate excess moisture by using desiccants or have a catch can or other suitable removable pan to remove salt buildup and collected moisture.

$SO_2$ and $SO_3$ are corrosive to metals. In one or more embodiments, the pipes and equipment used to capture $SO_x$ are coated metals to prevent corrosion. In another one or more embodiments, the pipe and equipment used are fabricated from plastic, ceramics, or other suitable material not susceptible to corrosion. Although $SO_2$ and $SO_3$ are corrosive and acidic, they are rich in heteroatoms to chelate and absorb to cationic metals, organometallics, and other heteroatoms. "Heteroatoms" are any organic atoms that are not carbon and hydrogen atoms, not limited to sulfur, nitrogen, and oxygen.

Fuel Combustion

When the engine is consuming a fuel, the fuel combusts and produces $SO_2$ and $SO_3$ gases. Fuel combustion uses any suitable fuel source and oxygen source. The fuel source is not particularly limited to fossil fuels and comprises various other fuel sources including solid synthetic propellants, biofuels, biomass, hydrogen gas, and in some instances natural gas. The oxygen source is not particularly limited to oxygen from air and comprises various other oxygen sources including liquid oxygen, nitrous oxide, nytrox, ammonium nitrate, ammonium dinitramide, ammonium perchlorate, or potassium nitrate. In one or more embodiments, the heat released from the fuel source and the oxygen from the oxygen source create $SO_2$ and $SO_3$ during fuel combustion.

In one or more embodiments, $SO_x$ is added or re-routed to the engine along with a fuel source or oxygen source. Because of this, the process to capture $SO_x$ may use $SO_x$ as a fuel source or an oxygen source.

The fuel consumed during combustion in an engine will vary, as will the amount of $SO_x$ combustion byproducts, described previously. In a non-limiting example, the following exhaust gas composition originate from combustion of a diesel fuel: $N_2$, $H_2O$, $O_2>1\%$; $H_2<1\%$; $CO<1\%$; $PM<1\%$; $CO_2>1\%$; $SO_2$, $SO_3<1\%$; $NO$, $NO_2<1\%$. Non-limiting examples of concentration ranges of exhaust gas byproducts from combustion in a diesel engine include: $O_2$ (30,000-200,000 parts per million (ppm)); CO (5-1,500 ppm); hydrocarbons (10-400 ppm); NO (20-2,500 ppm); $NO_2$ (20-2,500 ppm); $SO_2$ (10-150 ppm). In another non-limiting example, the following gas components originate from combustion of a gasoline fuel from a spark-ignition gasoline engine: $N_2$, $H_2O$, $O_2>1\%$; $H_2>1\%$; $CO>1\%$; $CO_2>1\%$; $SO_2$, $SO_3<1\%$; NO, $NO_2<1\%$; aldehydes, organic acids alcohols, hydrocarbons, and smoke $<1\%$.

When burning one or more fossil fuels, combustion byproducts vary depending on the type of fuel used, the content of sulfur in the fuel, engine loads, and other suitable engine variables. As non-limiting examples, the following byproducts of $SO_x$ (g/kWh) (grams per kilowatt-hour) are expected under various engine loads and conditions. In regards to the term "byproducts," within the context of this application the term refers to all exhaust materials, including main combustion resultants (for example, carbon dioxide, water) and resultants due to imperfect combustion (for example, carbon monoxide, unburnt hydrocarbons). With an engine load of 100% and engine power of 9800 kW, HFO (heavy fuel oil) combustion provides around 2.96 g/kWh $SO_x$; MGO (marine gas oil) combustion provides around 0.18 g/kWh $SO_x$. With an engine load of 75% and engine power of 7350 kW, HFO combustion provides around 2.91 g/kWh $SO_x$; MGO combustion provides around 0.18 g/kWh $SO_x$. With an engine load of 50% and engine power of 4900 kW, HFO combustion provides around 3.33 g/kWh $SO_x$; MGO combustion provides around 0.18 g/kWh $SO_x$. With an engine load of 25% and engine power of 2450 kW, HFO combustion provides around 3.14 g/kWh $SO_x$; MGO combustion provides around 0.19 g/kWh $SO_x$. Thus, in one or more embodiments, higher concentrations of $SO_x$ are captured at lower engine loads.

Engine Exhaust Emissions

As described previously, sulfur dioxide and sulfur trioxide are typically gases that are emitted out of engine exhaust emissions; however, in one or more embodiments, the engine exhaust emissions pass from the engine exhaust emissions pipe to a processing unit.

An "engine" is any type of fossil-fuel powered motor using fuel combustion processes. Types of engine include, but are not limited to, an internal combustion engine, a heavy fuel oil (HFO) engine, a diesel engine, a generator, a gasoline engine, a two stroke, a four stroke, and a jet engine. One skilled in the art would appreciate the vast array of fossil-fuel powered motors and apply them to the definition of an engine.

An engine comprises an exhaust. The "exhaust" comprises a conduit not limited to a tailpipe. Through the conduit flows byproducts of fossil-fuel combustion; non-limiting examples of the byproducts are chemical components like gases, vapors, liquids. Other non-limiting examples of the byproducts include thermodynamic energy such as heat. Chemical and physical components of the byproducts of fossil-fuel combustion make up exhaust emissions. The exhaust expels chemical components and heat of the combustion process away from the engine, evacuating these combustion byproducts and components from the engine.

$SO_x$ is found in exhaust emissions of various engine types. $SO_x$ is not limited to spark ignition engines and compression ignition engines. Therefore, one or more embodiments of systems can be affixed to vehicles with one or more engines. As well, one or more embodiments of systems can be part of a system with one or more engine types. In one or more embodiments, engine exhaust emissions from more than one type of engine, such as in marine ships or drilling rings, are aggregated.

Fuel delivery and general processes of the engine are not particularly limited in the production of engine exhaust emissions so long as the engine is using a fossil fuel having at least a de minimus amount of sulfur content. The fuel delivery system is configured to distribute fossil fuels that may comprise sulfur, sulfur oxides, or both, and an oxygen source into an engine, where the engine induces combustion between the two. The fuel delivery and general processes of the engine may redistribute unburnt fossil fuels that may comprise sulfur or sulfur oxides back into the engine during the combustion process. Alternatively, the fuel delivery and general processes of the engine may redistribute unburnt fossil fuels outside into the atmosphere.

An engine burning fossil fuels operates at wide ranges of temperatures. An engine operating temperature range of a given engine is any suitable engine operating temperature, not limited to a range of from about 50° C. to about 1,500° C. As a non-limiting example, low temperature combustion engines operate at the lower end of the temperature operating range, and high temperature jet engines may operate at the higher end of the temperature operating range.

An engine burning fossil fuels operates at wide ranges of pressures. In non-limiting examples, a cylinder pressure may have a range of from about 600 pounds per square inch (psi) to about 2000 psi. Meanwhile, in other non-limiting examples, a jet engine may range from specific pressure ratios, for example, in a range of from about 1:1 to about 100:1.

An exhaust of an engine burning fossil fuels generally passes at elevated temperature, elevated pressure, or both. Non-limiting examples of an elevated temperature include a diesel fuel burning engine having an exhaust temperature in a range of from about 100° C. to about 700° C., a gasoline fuel burning engine having an exhaust temperature in a range of from about 300° C. to about 950° C., and a jet engine having an exhaust temperature in a range of from about 500° C. to about 2,000° C.

In other non-limiting examples, a fossil-fuel burning engine has an elevated pressure that is greater than atmospheric when evacuated from a combustion area within an engine. The exhaust pressure range is at its maximum immediately after the exhaust gas exits the combustion area and generally decreases in pressure as it passes through the exhaust. A gasoline fuel-burning engine may have an exhaust pressure in a range, for example, of from about 50 kilopascal (kPa) to about 600 kPa.

One or more embodiments of the process to capture $SO_x$ includes after treatment of the exhaust gas emissions. An "after treatment" is a technique to extract byproducts from the exhaust gas to prevent it from being emitted to the environment. These after treatment techniques and others can be used with or in conjunction with the process to extract $SO_x$.

Due to high temperatures of combustion and exhaust gases, an engine generally has a cooling system installed. A cooling system or cooling device, in the form of a heat-exchanger, cools down the exhaust gas emissions after combustion in one or more engines. Any type of heat exchanging device that has sufficient cooling capacity can be used in this process. The "sufficient cooling capacity" is the cooling ability of the heat exchanging device to bring the temperature of the exhaust gas emissions from the engine exhaust emissions temperature range, as it passes from the engine, to the target cooling temperature. The "target cooling temperature" is 20° C. to 50° C. In one or more embodiments, the engine exhaust emissions temperatures are reduced from the exhaust temperature to a range of from about 20° C. to about 50° C. The heat-exchanging device can vary in dimension, makeup, material composition, and placement or purpose in relation to the engine. The heat exchanging device can be multiple heat exchanging devices. The heat exchanging device may comprise one or more types of heat exchangers, including, but not limited to, radiators, intercoolers, intake coolers, and exhaust coolers. In any type of heat exchanging device, the material used are resistant to any type of exhaust component of combustion, not limited to resistance from corrosion of sulfur oxides and water.

In one or more embodiments, there are several sources of heat in internal combustion engine that are used in the desorption process. The heat emitted from tailpipe, exhaust, engine coolant, turbocharger and supercharger cooler, and heat exchanger of the lubricant are but a few of several waste heat sources from an engine. These sources of waste heat can be exploited by collecting the heat using an intermediator fluid and passing such heated intermediary fluid into the absorption units to facilitate the desorption and regeneration stages for a pressure swing absorption unit (PSA).

For one or more embodiments of onboard systems, there is significant quantity of waste heat from the engine exhaust that is useful for regeneration of the sorbent, as will be further described. A non-limiting example of waste heat regenerating the sorbent is provided as follows. With a content of 1% sulfur in diesel, there are 0.265 moles of sulfur per liter of diesel fuel; this sulfur becomes $SO_x$ in the combustion process, requiring 7.9 kilojoule (kJ) of heat to regenerate the sorbent (with 30 kJ/mol (kilojoule/mole) heat of desorption). In one or more embodiments, the waste heat from a diesel engine is about 50% of the heating value of the fuel. In this non-limiting example, there is 18,700 k of total waste heat that can be used to regenerate a sorbent; the sorbent uses 7.9 kJ of heat of desorption.

In one or more embodiments, when the engine is cold or malfunctioning, the waste heat from the exhaust is conserved or routed away from the system to capture $SO_x$. Furthermore, any system using waste heat from the engine may not be used with a cold or malfunctioning engine. A non-limiting example of a system using waste heat includes halting the regeneration of the sorbent. "Cold" means that although the engine is operating, that is, combustion is occurring within the engine, the temperature of the engine is not within an as-designed temperature operating range.

Vehicles

Many types of power plants, including engines, can be fitted onboard vehicles that emit $SO_2$ and $SO_3$ through exhaust emissions. In one or more embodiments, a vehicle has one or more engines. The word "vehicle" means any moving body that includes a fossil-fuel burning engine and is regularly used for transport. This includes road-going, off-road, race, marine vessels, air vehicles, and any other suitable vehicle. Air vehicles are not limited to airplanes, rockets, space vehicles, blimps, gliders, drones, and transport balloons. A vehicle is a transport machine that is not limited in ability to transport, for example, people or goods. The vehicle is not limited to a motor vehicle, as other power sources conceivably power the main drive of the vehicle, while a fossil-fuel burning engine is equipped on the vehicle.

In one or more embodiments, a marine vessel has one or more engines. The word "marine vessel" means any vehicle that includes a fossil-fuel burning engine and is regularly used for water-going purposes. A marine vessel can be built or modified for the intent of being stored, housed, or operated underwater or on the water surface. This includes lake, river, sea, and ocean-going vessels that were originally designed to be used underwater or on the surface of water, or that have been adapted to doing so, and any other suitable water vehicle. In one or more embodiments, a marine vessel having a fossil-fuel burning engine that was not originally built to be used in or on water has been adapted for this purpose. The marine vessel may be a moving, fixed, or temporarily fixed marine vessel underwater or on water. Examples of a moving marine vessel are not limited to, for example, a boat, a ship, a submarine, a jet ski, a boat-plane, or a car-boat. Examples of a temporarily fixed marine vessel are not limited to, for example, a houseboat, a docked or stationary boat or ship, a platform, a rig, a fixed ship in a shipyard, a fixed ship in a dry-dock, a floating device, or a ship affixed to land adapted for terrestrial purposes. Examples of a fixed marine vessel are not limited to, for example, a platform, a bridge, a drawbridge, a road, a railroad, a tunnel, and a power plant.

In one or more embodiments, a marine vessel is a rig or platform. The word "rig" as applied to a marine vessel is a platform not limited to an oil platform or offshore drilling rig. The rig generally pumps, processes, and stores oil, natural gas, and other natural resources. Various engines and devices with engines are found on a rig for various purposes including hoisting, pumping, generating electrical power, and processing hydrocarbons.

In one or more embodiments, a marine vessel is a ship. A ship can have one or more engine. A ship includes but is not limited to surface-going, submersible, steam-powered, nuclear-powered, wind-powered, propeller driven, human operated, and engine operated variants. The ship is not limited to a motor-propelled ship, as other power sources conceivably power the main drive of the ship, while a fossil-fuel burning engine is equipped on the ship emitting $SO_2$ and $SO_3$.

In vehicle(s) comprising engine exhaust emissions and the process to capture $SO_x$, the assembly components for the method are stored on vehicle, that is, the assembly moves as part of the mobile vehicle. These components include absorption units that are otherwise known as pressure swing absorption units (PSA).

Ionic Liquids

Within the PSA, absorption units are housed. In one or more embodiments, absorption units comprise a sorbent composition that can be a mixture of chemicals. In the mixture of chemicals, ionic liquids (ILs) make up a component. ILs are used to capture $SO_x$ from the exhaust by separating and purifying gases like $SO_2$ and $SO_3$. The sorbent composition can be of any suitable liquid, not limited to ILs. Ionic liquids can separate and purify acidic gases like $SO_x$.

In one or more embodiments, the IL is a cationic-based ionic liquid that includes but is not limited to tetramethylguanidinium lactate (TMGL) and phenyl-azole compounds. The cationic-based IL is supported on solid porous media, including materials such as silicas, zeolites, aluminum oxides, carbon, or other suitable materials. In one or more embodiments, the IL is a functionalized IL that includes but is not limited to configurations that include functionalization with metal chelate cations. The metal chelate IL possesses absorption capacity and reversibility (desorption) that is achieved through physical and chemical interactions between the IL and the acidic $SO_x$. These metal chelate ILs are also supported on solid porous media or any other suitable material surface. The chemical interaction between the metal (M) and $SO_x$ is not particularly limited and takes place at the M-S bond, the M-O bond, the M-[SO] bond, or multiple metals to any one of the former bonds, for example, M-S-M, M-O-M, and M-[SO]-M.

In one or more embodiments using a cationic-based IL comprising tetramethylguanidinium lactate (TMGL), a 1,1,3,3,-tetramethylguanidinium is used with silica particles and lactic acid to form the solid porous media of TMGL nanosilica particles. The TMGL forms a coating as it is affixed by known chemical methods to the outer surface and inner surface of the porous particle and its pores. The surface area of porous TMGL nanosilica particles may be dependent on the ratio between TMGL and nanosilica.

In one or more embodiments, the cationic-based IL uses a phenyl-azole class of compounds as the ionic liquid. The azole used is not particularly limited as long as it is a phenyl-containing azole ion. The phenyl-azole ion can be anionic affixed to the surface, with cationic counterions, or the phenyl-azole can be cationic affixed to the surface, with anionic counterions. Cationic and anionic phenyl-azoles can be used, alternating the charge on the IL. Depending on the use of a coordinating or a non-coordinating counterion, an anionic phenyl-azole can be used to capture acidic $SO_x$. It is one or more embodiment of the IL comprising a phenyl-azole, and ILs in general, that when considering water capture versus $SO_x$ capture, the IL is designed for $SO_x$ capture and not for water capture. "Water capture" is the process of capturing $H_2O$ at a site where $SO_x$ would usually have been captured, or absorbed, through chemical interactions.

One or more embodiments of the functionalized ILs include nonionic surfactants. Nonionic surfactants are not limited to nonyl phenol polyoxyethylenes mixed with alkali metal salts. Sodium, lithium, and potassium salts can be readily mixed with nonyl phenol polyoxyethylenes to form metal chelate cationic absorption sites that are functionalized ILs.

In one or more embodiments, the polymer functionalized ILs can be combined with any other suitable IL for a synergistic capture of $SO_x$. Where a metal site may strongly absorb $SO_2$ or $SO_3$, a polymer may absorb more volume of gas, albeit weakly, in its matrix. Adjustment of the cationic IL and the polymeric IL provides for a stronger capture or a higher volume capture as follows. When more cationic IL metal binding sites are present in solution as compared to heteroatom binding sites, a stronger capture of $SO_x$ may result than when more heteroatom binding sites are present in solution as compared to metal binding sites. When more cationic IL heteroatom binding sites are present in solution as compared to metal binding sites, a higher volume capture of $SO_x$ may result than when more metal binding sites than heteroatom binding sites are present. The strength and volume of capture also depend on the type of engine, conditions, vehicle, and exhaust gas emissions. With more fuel consumption in a larger vehicle, engine, or engine load, the IL composition in one or more embodiments may be adjusted for higher volume capture of $SO_x$ before use, as described previously. With less fuel consumption in a smaller vehicle, engine, or engine load, the IL composition in one or more embodiments may be adjusted for stronger capture of $SO_x$ before use, as described previously.

In one or more embodiments, the IL sorbent composition is designed to absorb $SO_x$ at temperatures in a range of from about 20° C. to about 50° C. At greater temperatures, for example, greater than 50° C., absorption capacity of the sorbent is reduced than at temperatures under 50° C. The temperature dependency of the sorbent composition allows for absorption and desorption cycles based, in part, on changing temperature of the sorbent.

In some embodiments, sub-atmospheric pressures are used as part of the desorption portion of the process to remove site-specific bound $SO_x$ and form desorbed $SO_x$ gas. When an IL with stronger capture of $SO_x$ is used, vacuum or sub atmospheric pressures allow for improved desorption than without the use of such a vacuum drive.

Absorption/Desorption Units

FIG. 1 shows a diagram of an on-board system 100 to capture $SO_x$ on vehicles in accordance to one or more embodiments. One or more engines 102 passes engine exhaust gas or engine exhaust emissions 104 to heat exchanging device(s) 106. The engine exhaust emissions 104 are cooled at the heat exchanging device(s) 106 to produce cooled exhaust gas or cooled engine exhaust emissions 108. Waste heat from one or more engine 110 can be routed to a PSA unit comprising absorption units 112. A $SO_x$ lean stream 114, 116, 118, stripped of $SO_x$, is passed either to atmosphere 114 or rerouted in the process 116, 118 to re-capture any remaining $SO_x$. A $SO_x$ rich stream 120 comprising captured $SO_x$ is passed to the chemical conversion unit(s) 122 or to the $SO_x$ compression 124 to create one or more $SO_x$ products. $SO_x$ products from the chemical conversion unit(s) are stored on vehicle in onboard chemical tanks 130. $SO_x$ products from the $SO_x$ compression are stored on vehicle in onboard compressed $SO_x$ tanks 132. At a future point, one or more $SO_x$ products are moved from onboard chemical tanks 130 or onboard compressed $SO_x$ tanks 132, or both, and into tanks 136, 138 at an off-vehicle facility 134. In one or more embodiments, $SO_x$ products may include $SO_x$ products from the chemical conversion unit(s) and $SO_x$ products from the $SO_x$ compression.

One or more embodiment processes of recovering $SO_x$ from engine exhaust is as follows. The exhaust gas comprising $SO_x$ is cooled to ambient or near-ambient temperatures using a heat exchanging device before the cooled exhaust gas is routed through the PSA unit. In some embodiments, the temperature of the cooled exhaust gas is ambient temperature. In some other embodiments, the temperature of the cooled exhaust gas is less than ambient temperatures. The PSA unit comprises two or more absorption units. The absorption units are absorption/desorption vessels. The PSA unit may absorb $SO_x$. In one or more embodiments, the capture of $SO_x$ comprises absorption of $SO_x$ from the cooled exhaust gas onto a sorbent.

"Desorption" is the reverse process of absorption.

"Absorption" is the process where an "absorb", meaning an atom, ion, molecule, charge, portion of a molecule, or substance dissolves within another, called an "absorbent." The "absorb" is "absorbed" into the "absorbent"; the process is called "absorption" and relates to dissolving. In one or more embodiments, absorption may include adsorption.

Exhaust gas comprising $SO_x$ can be cooled to ambient temperature using a heat exchanging device. The heat exchanging device 106 is configured such that the exhaust gas 104 traverses the heat exchanging device 106 and forms the cooled exhaust gas 108 before passing into the absorption units 112, FIG. 1.

The heat-exchanging device or devices that are used to cool may also be used to heat or cool the system to capture $SO_x$. In one or more other embodiments, one or more separate heat exchanging devices direct waste heat captured from engine systems to areas in the process to capture $SO_x$. A non-limiting example includes heat from an engine coolant system that is sent to absorption units for $SO_x$ desorption, such as shown in FIG. 1 as stream 110. Although not shown, alternatively, in one or more embodiments, a heat-exchanging device may be used to cool areas of the engine and, simultaneously areas in the process to capture $SO_x$. A non-limiting example includes an external cooling system spraying into the intake to cool an intake air charge that also sprays onto exhaust tubing to cool exhaust gas before intake into the absorption units of the PSA.

In one or more embodiments, a heat exchanging device that is a plate heat exchanging device is used. A plate heat exchanging device includes one or more plate heat exchangers that is compact and has a low-pressure drop. The low-pressure drop may reduce fuel consumption in the engine because of a reduced back pressure against the engine.

In one or more embodiments, a heat exchanging device includes a heat exchanger that is air-cooled. "Air-cooled" means cooled by air at ambient temperature. "Ambient temperature" means the temperature of the natural environment without other modification. An air-cooled heat exchanger is useful when the ambient temperature is within 10° C. of the target cooling temperature, for example, in a range of from about 0° C. to about 50° C.

If the ambient temperature is greater than 10° C. from the target cooling temperature, then refrigeration is used. The air conditioning system onboard a vehicle or marine vessel may be expanded to provide sufficient cooling capacity (level of cooling duty) or a separate refrigeration system may be used. Alternatively, waste heat recovery devices can be placed before a heat exchanging device to extract and convert heat into power. In such instances, however, the heat exchanger 106 of FIG. 1 is still used but its configuration may be for a smaller amount of heat transfer.

In one or more embodiments, $SO_x$ extraction and storage is not 100% efficient. In some instances, a portion of the $SO_x$ lean stream may be recirculated back through the engine 102, such as stream 116, to provide for a higher percent capture of $SO_x$, or upstream of the heat exchanger 106, such as stream 118, for dilution of the engine exhaust emission.

Capture of $SO_x$ $SO_x$ capture takes place in the one or more absorption unit(s) in the PSA at ambient temperature (0-50° C.). In one or more embodiments, the pressure of the PSA is controlled. The capture of $SO_x$ comprises the "absorption" step. When one absorption unit and its sorbent is saturated with $SO_x$, the flow path switches to pass the exhaust gas through an alternative absorption unit. Here, the absorption step occurs a second time or more, according to a process cycle of a PSA. PSA units and the cyclical processes of absorption, desorption, regeneration, and purging are well known in the art. Several points in relation to $SO_x$ capture and purification are noted.

Desorption is carried out at higher temperature (70-100° C.) in the one or more absorption unit(s) of the PSA. In one or more embodiments, there are no more and no less than two absorption units in the PSA. In some embodiments, the heat to recover the sorbent and desorb $SO_x$ is provided from the waste heat coming from the exhaust or from the engine of the vehicle.

A portion of embodiment processes that capture $SO_x$ comprise the regeneration of sorbent. The regeneration of sorbent takes place after desorption of $SO_x$ as the absorption vessels alternate between the states of absorption, desorption, and regeneration. When desorption is complete from the absorption unit(s), desorbed $SO_x$ passes through the $SO_x$ rich stream line 120, as seen in FIG. 1. The "$SO_x$ rich stream" is the stream that comprises the desorbed $SO_x$. In one or more embodiments, the $SO_x$ rich stream contains liquids, condensates, gas, or combinations thereof. When the $SO_x$ desorption is complete, the PSA can be opened, purged, or vacuumed to remove any residual materials remaining from the intake of cooled engine exhaust emissions. This process called "purging" removes gas from an area; once removed, the gas or suitable material has been "purged." When purging of one or more absorption units in the PSA is complete, the cycle repeats, starting with cooled engine exhaust emissions comprising $SO_x$. Conduit(s) that exit the absorption unit(s) of the PSA allow for the flow and release of both rich $SO_x$ and lean $SO_x$ stream after the absorption process through passages.

In one or more embodiments, "enhanced desorption" is desorption of sulfur oxides comprising $SO_2$ and $SO_3$ carried out in the PSA at less-than-atmospheric pressure. Such conditions in embodiment processes may be provided by a vacuum pump of a vehicle or marine vessel, or other suitable vacuum source. Although the desorption process occurs at the greater temperature range, some acidic $SO_x$ particles may remain in the sorbent. Using reduced pressure in the form of a partial vacuum in some embodiment processes, the gases that chemically interact with the sorbent are released. In one or more embodiments, a greater concentration of $SO_3$ remains on the sorbent after desorption than $SO_2$. When $SO_x$ gas has been removed, the sorbent is regenerated.

In one or more embodiments where vacuum is generated by the engine, no extra energy is used to reactivate the sorbent material. For example, in the case of a gasoline engine, when the intake valve opens, the air-fuel mixture is drawn into the combustion chamber by the downward movement of the piston, which creates a suction. This is better known as a manifold vacuum. Manifold vacuum can be utilized to reduce the pressure during enhanced desorption. No extra energy is used to reactivate the sorbent material in this case. In view of the foregoing, one or more embodiments provides the capture of $SO_x$ with no external input of energy besides that of the engine, for a sustainable recycling process.

In other embodiments, a vacuum chamber is used to store a small vacuum input over time to create a larger vacuum source that can be introduced to the PSA to encourage enhanced desorption. Diesel engines are known not to generate a similar manifold vacuum found in a gasoline engine. In one or more other embodiments, a vacuum pump is provided to carry out desorption at a sub-atmospheric pressure.

In one or more embodiments where the hot fluid is directed into one or more absorption unit(s) for regeneration, there is no direct contact between the heating fluid and the sorbent materials. In other instances, there is no direct contact between the heating fluid and the exhaust gas. In one or more embodiments, the absorption units of the PSA are in a shell-and-tube configuration, where the tubes are packed with the sorbent materials and the heating fluid passes inside the shell, transferring heat while not coming in direct contact with the sorbent materials.

Compression and Conversion of $SO_2$ and $SO_3$

In one or more embodiments, after $SO_x$ is extracted and then desorbed, the desorbed $SO_x$ can be processed in two different manners. When the absorption units are full, the PSA will release a $SO_x$ rich stream gas, as described previously. One or more embodiments involves a storing route, where the desorbed $SO_x$ in the $SO_x$ rich stream is compressed and stored as a $SO_x$ product in a compression storage tank. One or more embodiments involves a chemical conversion route where the desorbed $SO_x$ in the $SO_x$ rich stream reacts with one or more chemical reactants in a chemical conversion unit to form the $SO_x$ product.

In one or more previously disclosed embodiments, the absorbed $SO_x$ is protected from water and water vapor. However, in one or more embodiments of the chemical conversion route, ammonia and water are used to form a $SO_x$ product to create ammonium sulfur salts, as in Formula IX. A non-limiting example with $SO_2$ is provided in Formula XVII; ammonium-sulfur salts can be formed as a $SO_x$ product, stored on the vehicle, and then unloaded to an off-vehicle facility at a later step.

$$SO_x(g)+H_2O(aq)+NH_3(g)\rightarrow(NH_4)_2SO_x(s) \qquad \text{(Formula IX)}$$

$$SO_2(g)+H_2O(aq)+2NH_3(g)\rightarrow(NH_4)_2SO_3(s) \qquad \text{(Formula XVII)}$$

To create a $SO_x$ product that is a chemical conversion product, a chemical conversion route is used. The chemical conversion route directs desorbed $SO_x$ in the $SO_x$ rich stream from line 120 into one or more chemical conversion unit 122. One or more chemical conversion unit(s) permits the reaction of desorbed $SO_x$ with one or more of the chemical reactants to form a $SO_x$ product on the vehicle. The $SO_x$ product may be useful in other industrial products or as any suitable end product.

In one or more embodiments, Formulas I and II are used to generate $SO_x$ products sodium sulfite and sodium sulfate in the absence of oxygen, using desorbed $SO_x$. Desorbed $SO_x$ gas is mixed with sodium hydroxide in a molar ratio of 1:2 to create sodium sulfite or sodium sulfate. In the case of sodium sulfate generation, hydrogen gas is given off. In the case of sodium sulfite generation, water is produced. Sodium sulfite and sodium sulfate can be chemical intermediaries or end products. In one or more embodiments of chemical reactions, water is separated for storage or a use not limited to a coolant for a heat exchanging device, for general purpose cleaning, or consumption.

$$SO_2(g) + 2NaOH(s) \rightarrow Na_2SO_4(s) + H_2(g) \quad \text{(Formula I)}$$

$$SO_3(g) + 2NaOH(s) \rightarrow Na_2SO_3(s) + H_2O(aq) \quad \text{(Formula II)}$$

In one or more embodiments, Formulas III and IV are used to generate $SO_x$ products sodium sulfite and sodium sulfate in the presence of oxygen using desorbed $SO_x$. Desorbed $SO_x$ gas is mixed with sodium carbonate and oxygen in a ratio of 2:2:1 to produce sodium sulfite and carbon dioxide gas. Similarly, captured $SO_x$ gas is mixed with sodium bicarbonate and oxygen in a ratio of 2:4:1 to produce sodium sulfate or sodium sulfite, carbon dioxide gas, and water. Sodium sulfite and sodium sulfate can be chemical intermediaries or products. In one or more embodiments of any suitable chemical reaction, carbon dioxide is separated for storage or use, not limited to cooling systems comprising a heat exchanging device, for general purpose welding, for use as a propellant, for use as a compressed coolant, or consumption.

$$SO_x(g) + Na_2CO_3(s) + \frac{1}{2}O_2(g) \rightarrow Na_2SO_3(s) + CO_2(g) \quad \text{(Formula III)}$$

$$SO_x(g) + 2NaHCO_3(s) + \frac{1}{2}O_2(g) \rightarrow$$
$$Na_2SO_x(s) + 2CO_2(g) + H_2O(aq) \quad \text{(Formula IV)}$$

In one or more embodiments, Formulas V and VI are used to generate $SO_x$ products calcium sulfite and calcium sulfate using desorbed $SO_x$. Calcium sulfite and calcium sulfate can be chemical intermediaries or products, such as food additive and wood pulp production.

$$SO_2(g) + CaO(s) \rightarrow CaSO_3(s) \quad \text{(Formula V)}$$

$$SO_3(g) + CaO(s) \rightarrow CaSO_4(s) \quad \text{(Formula VI)}$$

In one or more embodiments, Formulas VII and VIII are used to generate $SO_x$ products sulfurous acid and sulfuric acid using desorbed $SO_x$. Sulfurous acid and sulfuric acid can be used for a variety of purposes not limited to intermediary and product chemical production, for example, fertilizer and industrial cleaning agent production.

$$SO_2(g) + H_2O(aq) \rightarrow H_2SO_3(l) \quad \text{(Formula VII)}$$

$$SO_3(g) + H_2O(aq) \rightarrow +H_2SO_4(l) \quad \text{(Formula VIII)}$$

In one or more embodiments, Formula IX is used to generate $SO_x$ products ammonium sulfite and ammonium sulfate. Ammonium sulfite and ammonium sulfate can be used for a variety of purposes not limited to intermediary and product chemical production, for example, artificial fertilizers and food coloring.

$$SO_x(g) + H_2O(aq) + NH_3(g) \rightarrow (NH_4)_2SO_x(s) \quad \text{(Formula IX)}$$

The products from the prior-described chemical processes have potential use in a number of industries and are not limited to the recited uses for the respective product. Nor are the products limited to these particular embodiments, for example, any suitable sodium salt, potassium salt, ammonium salt, or acid may be synthesized from desorbed $SO_x$. These chemical reactions, and others not listed, may take place in a chemical conversion unit 122 that is dedicated to one or multiple types of reactions, FIG. 1. In one or more embodiments, the chemical conversion unit is part of the system on the vehicle and conversion occurs while the vehicle is moving.

$$SO_2(g) + 2NaOH(s) \rightarrow Na_2SO_4(s) + H_2(g) \quad \text{(Formula X)}$$

$$SO_3(g) + 2NaOH(s) \rightarrow Na_2SO_3(s) + H_2O(aq) \quad \text{(Formula XI)}$$

$$SO_x(g) + Na_2CO_3(s) + \frac{1}{2}O_2(g) \rightarrow Na_2SO_3(s) + CO_2(g) \quad \text{(Formula III)}$$

$$SO_x(g) + 2NaHCO_3(s) + \frac{1}{2}O_2(g) \rightarrow$$
$$Na_2SO_x(s) + 2CO_2(g) + H_2O(aq) \quad \text{(Formula IV)}$$

$$SO_2(g) + CaO(s) \rightarrow CaSO_3(s) \quad \text{(Formula XII)}$$

$$SO_3(g) + CaO(s) \rightarrow CaSO_4(s) \quad \text{(Formula XIII)}$$

$$SO_2(g) + H_2O(aq) \rightarrow H_2SO_3(l) \quad \text{(Formula XIV)}$$

$$SO_3(g) + H_2O(aq) \rightarrow H_2SO_4(l) \quad \text{(Formula XV)}$$

$$SO_x(g) + H_2O(aq) + NH_3(g) \rightarrow (NH_4)_2SO_x(s) \quad \text{(Formula XVI)}$$

In one or more embodiments, $SO_x$ products produced from chemical conversion of $SO_x$ 122 comprise water or other gases, FIG. 1. After the chemical conversion products are held onboard a vehicle, any potentially explosive salt products are diluted with water or kept in an aqueous solution for storage and transfer. In some embodiments, any inert or stable salt products may be dried during transit using waste heat from, for example, the exhaust and vacuum systems onboard. Any gaseous byproducts from the chemical conversion process are either released to the environment if not harmful, recycled, or sent back through the exhaust of the engine for after treatment. In the chemical conversion route, the desorbed $SO_x$ reacts with one or more of the chemical reactants provided to produce chemical products that can be utilized in several industrial applications not limited to agriculture.

The one or more $SO_x$ product can be stored as a $SO_x$ gas in one or more embodiments. The storing route may include a compressor and a compressed $SO_x$ gas tank on the vehicle. The compressed $SO_x$ gas tank is useful for storing compressed $SO_x$ gas as a $SO_x$ product. The desorbed $SO_x$ in the $SO_x$ rich stream is fed to the compressor, compressed in the compressor, and the compressed $SO_x$ gas stored in the compressed gas tank. In one or more embodiments, the compression occurs with a compressor inline between the $SO_x$ rich stream and the $SO_x$ compression storage tank(s) 124, FIG. 1. In one or more embodiments, the $SO_x$ compression storage tanks are a bank of tanks.

The compressed $SO_x$ is stored as a compressed gas tank at a pressure in a range of from about 350 kPa to about 380 kPa. When the pressure of $SO_x$ storage is greater than the range of from about 350 kPa to about 380 kPa, some $SO_x$ may begin to liquefy or condense. A storage temperature for compressed $SO_x$ is a temperature is in a range of from about 30° C. to about 35° C. When the temperature of $SO_x$ storage is less a range of from about −5° C. to about 0° C., compressed $SO_x$ may begin to liquefy.

Some sulfur oxides have the ability to take a liquid or solid form under specific conditions. In one or more embodiments, liquid $SO_x$ can be stored in compressed tanks in a refrigerated room of around −10° C. or by using compression pressures greater than in a range of from about 380 kPa to about 400 kPa.

Unloading $SO_2$, $SO_3$, and Recycled Products

The formed products can be stored onboard then unloaded in any suitable off-vehicle facility. The unloading of materials takes place at the end of one or more $SO_x$ product formation, either from compressed $SO_x$ storage, from chemical conversion, or from both. The unloading of materials moves the $SO_x$ product to an off-vehicle facility 134, FIG. 1. "Off-vehicle" means a location in an area of a different vehicle, marine vessel, of another suitable location not limited to a gas station or hub, apart from the mobile platform in which the original $SO_x$ was produced, refined, and formed into a product.

In one or more embodiments, the unloading of $SO_x$ product is a final step of the method to capture $SO_x$. Product $SO_x$ can be unloaded as a $SO_x$ product to an off-vehicle facility storage tank or as fully pressurized cylinders or "bullets" to an off-vehicle facility location. The compressed gas tank(s) or bank on the vehicle are either permanent or detachable and replaceable.

In one or more embodiments of the process, the one or more $SO_x$ product is a stored chemical conversion intermediary, product, or finished good or any other suitable form of chemically converted product. The $SO_x$ products are then transferred to an off-vehicle facility storage.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A process, comprising:
    cooling engine exhaust emissions comprising $SO_x$ on a vehicle, where the vehicle has an engine providing the engine exhaust emissions;
    passing the cooled engine exhaust emissions comprising $SO_x$ to one or more absorption units;
    extracting the $SO_x$ from the engine exhaust emissions with a sorbent supported on solid porous media in the one or more absorption units on the vehicle so as to form an absorbed $SO_x$;
    desorbing the absorbed $SO_x$ so as to form a desorbed $SO_x$ on the vehicle;
    forming one or more $SO_x$ product from the desorbed $SO_x$ on the vehicle, where the one or more $SO_x$ products is a pressurized $SO_x$ gas stored in a storage tank; and
    unloading the one or more $SO_x$ products from the vehicle to an off-vehicle facility.

2. The process of claim 1, where the solid porous media is selected from the group consisting of silicas, zeolites, aluminum oxides, carbon, and combinations thereof.

3. The process of claim 1, where the sorbent is selected from the group consisting of cationic-based ionic liquids, functionalized ionic liquids with metal chelate cations, and combinations thereof.

4. The process of claim 3, where the functionalized ionic liquids with metal chelate cations are selected from the group consisting of metal-polyoxyethylene derivatives, organometallic derivatives, metal-zeolite derivatives, metal oxides, metal-organic frameworks, and combinations thereof.

5. The process of claim 3, where the cationic-based ionic liquids are selected from the group consisting of tetramethylguanidinium lactate, an azole compound, ammonium salts, and combinations thereof.

6. The process of claim 1, where forming the one or more $SO_x$ products are one or more from the group consisting of sodium salts, sodium sulfite, sodium sulfate, potassium salts, calcium salts, calcium sulfite, calcium sulfate, ammonium salts, ammonium sulfur salts, ammonium sulfite, ammonium sulfate, acids, sulfurous acid, sulfuric acid, hydrogen gas, carbon dioxide gas, and water from the desorbed $SO_x$.

7. The process of claim 1, where the engine is of a type that is selected from the group consisting of diesel engines, gasoline engines, marine gas engines, marine diesel engines, diesel generators, gasoline generators, and combinations thereof.

8. The process of claim 1, where a fuel provided to the engine produces a $SO_x$ concentration in the engine exhaust emissions.

9. The process of claim 7, where the vehicle has more than one type of engine on the vehicle and the engine exhaust emissions from the more than one type of engine are aggregated before the step of cooling the engine exhaust emissions.

10. The process of claim 7, where the vehicle is an air vehicle.

11. The process of claim 1, where the storage tank includes porous media in the tank.

12. The process of claim 1, where the vehicle is selected from the group consisting of road-going vehicles, air-going vehicles, surface ships, submarines, a rig, and a floating device.

13. The process of claim 1, where the off-vehicle facility is a land-based station.

14. A process, comprising:
    cooling engine exhaust emissions comprising $SO_x$ on a vehicle, where the vehicle has an engine providing the engine exhaust emissions;
    passing the cooled engine exhaust emissions comprising $SO_x$ to one or more absorption units;
    extracting the $SO_x$ from the engine exhaust emissions with a sorbent supported on solid porous media in the one or more absorption units on the vehicle so as to form an absorbed $SO_x$;
    desorbing the absorbed $SO_x$ so as to form both a desorbed $SO_x$ and a depleted sorbent on the vehicle;
    applying a sub-atmospheric pressure source to the one or more absorption units such that the depleted sorbent is regenerated into a sorbent;
    forming one or more $SO_x$ product from the desorbed $SO_x$ on the vehicle; and unloading the one or more $SO_x$ products from the vehicle to an off-vehicle facility.

15. The process of claim 14, where the sub-atmospheric pressure source is a vacuum system of the engine.

16. The process of claim 14, where the sub-atmospheric pressure source is a vacuum pump or vacuum generator separate from the engine.

17. A process, comprising:
cooling engine exhaust emissions comprising $SO_x$ on a vehicle, where the vehicle has an engine providing the engine exhaust emissions;
passing the cooled engine exhaust emissions comprising $SO_x$ to one or more absorption units;
extracting the $SO_x$ from the engine exhaust emissions with a sorbent supported on solid porous media in the one or more absorption units on the vehicle so as to form an absorbed $SO_x$;
desorbing the absorbed $SO_x$ so as to form a desorbed $SO_x$ on the vehicle;
forming one or more $SO_x$ product from the desorbed $SO_x$ on the vehicle; and
unloading the one or more $SO_x$ products from the vehicle to an off-vehicle facility, where the off-vehicle facility is a second vehicle or a second marine vessel.

18. A process, comprising:
cooling engine exhaust emissions comprising $SO_x$ on a vehicle, where the vehicle has an engine providing the engine exhaust emissions, where the cooled engine exhaust emissions have a temperature in a range of from about 20° C. to about 50° C.;
passing the cooled engine exhaust emissions comprising $SO_x$ to one or more absorption units;
extracting the $SO_x$ from the engine exhaust emissions with a sorbent supported on solid porous media in the one or more absorption units on the vehicle so as to form an absorbed $SO_x$;
desorbing the absorbed $SO_x$ so as to form a desorbed $SO_x$ on the vehicle;
forming one or more $SO_x$ product from the desorbed $SO_x$ on the vehicle; and
unloading the one or more $SO_x$ products from the vehicle to an off-vehicle facility.

19. The process of claim 18, where the step of cooling the engine exhaust emissions further comprises transferring heat from the engine exhaust emissions to the one or more absorption units.

* * * * *